United States Patent
Rajan

(10) Patent No.: US 7,107,383 B1
(45) Date of Patent: Sep. 12, 2006

(54) METHOD AND SYSTEM FOR MULTI-CHANNEL TRANSFER OF DATA AND CONTROL INFORMATION

(75) Inventor: Sundar Rajan, Mountain Veiw, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/564,592

(22) Filed: May 3, 2000

(51) Int. Cl.
*G06F 13/36* (2006.01)
*G06F 13/20* (2006.01)
*G06F 13/40* (2006.01)

(52) U.S. Cl. .............. 710/306; 710/310; 710/311; 710/315

(58) Field of Classification Search ............. 370/395; 380/235; 382/232; 710/52, 300, 305, 310, 710/306, 311, 314, 315
See application file for complete search history.

(56) References Cited

U.S. PATENT DOCUMENTS

| | | | | |
|---|---|---|---|---|
| 5,588,125 A * | 12/1996 | Bennett ................ 710/306 |
| 5,600,646 A * | 2/1997 | Polomski ............... 370/263 |
| 5,774,683 A * | 6/1998 | Gulick ................. 710/315 |
| 5,805,845 A * | 9/1998 | Gulick ................. 710/310 |
| 5,826,048 A * | 10/1998 | Dempsey et al. ........... 710/306 |
| 5,832,245 A * | 11/1998 | Gulick ................. 710/306 |
| 5,911,055 A * | 6/1999 | Whiteman et al. ......... 710/305 |
| 5,964,859 A * | 10/1999 | Steinbach et al. ......... 710/310 |
| 5,983,291 A * | 11/1999 | Leger et al. ............ 710/52 |
| 5,996,034 A * | 11/1999 | Carter ................. 710/100 |
| 6,044,225 A | 3/2000 | Spencer et al. |
| 6,078,976 A * | 6/2000 | Obayashi ............... 710/315 |
| 6,078,980 A * | 6/2000 | Holland et al. ........... 713/400 |
| 6,081,863 A * | 6/2000 | Kelley et al. ............ 710/312 |
| 6,085,269 A * | 7/2000 | Chan et al. ............. 710/100 |
| 6,108,736 A * | 8/2000 | Bell .................. 710/107 |
| 6,112,311 A * | 8/2000 | Beardsley et al. .......... 714/3 |
| 6,189,063 B1 * | 2/2001 | Rekeita et al. ........... 710/311 |
| 6,247,086 B1 * | 6/2001 | Allingham .............. 710/314 |
| 6,272,582 B1 * | 8/2001 | Streitenberger et al. ..... 710/314 |
| 6,286,074 B1 * | 9/2001 | Batchelor et al. .......... 710/305 |
| 6,295,568 B1 * | 9/2001 | Kelley et al. ............ 710/305 |
| 6,311,247 B1 * | 10/2001 | Spencer ................ 710/307 |
| 6,330,241 B1 * | 12/2001 | Fort ................... 370/395.1 |
| 6,360,289 B1 * | 3/2002 | Porterfield .............. 710/104 |
| 6,404,928 B1 * | 6/2002 | Shaw et al. ............. 382/232 |
| 6,425,033 B1 * | 7/2002 | Conway et al. ........... 710/305 |
| 6,457,091 B1 * | 9/2002 | Lange et al. ............. 710/314 |
| 6,466,541 B1 * | 10/2002 | Peck .................. 370/229 |
| 6,477,646 B1 * | 11/2002 | Krishna et al. ........... 713/189 |
| 6,484,222 B1 * | 11/2002 | Olson et al. ............. 710/300 |
| 6,510,229 B1 * | 1/2003 | Geile .................. 380/235 |

(Continued)

FOREIGN PATENT DOCUMENTS

EP      0 654 743      11/1994

(Continued)

OTHER PUBLICATIONS

PCI Local Bus Specification. PCI Special Interest Group. Jun. 1, 1995. Revision 2.1. p. 1-282.*

(Continued)

*Primary Examiner*—Christopher Revak
*Assistant Examiner*—Christian LaForgia
(74) *Attorney, Agent, or Firm*—Brake Hughes PLC

(57) ABSTRACT

A system and method for transferring information in a multi-channel, point-to-point environment are described. In one embodiment, a number of processing chips are connected to a bridge bus. A bridge is connected to the bridge bus and to a system bus. In addition, a memory is connected to the bridge.

31 Claims, 9 Drawing Sheets

U.S. PATENT DOCUMENTS

| | | | |
|---|---|---|---|
| 6,549,964 B1 * | 4/2003 | Lai et al. | 710/107 |
| 6,567,882 B1 * | 5/2003 | Onagawa | 710/314 |
| 6,636,929 B1 * | 10/2003 | Frantz et al. | 710/313 |
| 6,668,299 B1 * | 12/2003 | Kagan et al. | 710/305 |
| 2003/0070018 A1 * | 4/2003 | Lai et al. | 710/107 |

FOREIGN PATENT DOCUMENTS

| | | |
|---|---|---|
| EP | 0 775 958 | 10/1996 |
| EP | 0817430 A2 | 1/1998 |
| GB | 2 337 403 | 11/1999 |
| WO | WO 96/22571 | 7/1996 |

OTHER PUBLICATIONS

Fawcett, Bradly K. Designing PCI Bus Interfaces with Programmable Logic. 1995. IEEE. p. 321-324.*

Partial International Search Report for International Application No. PCT/US 01/14336, which was filed on May 3, 2001.

* cited by examiner

METHOD AND SYSTEM FOR MULTI-CHANNEL TRANSFER OF DATA AND CONTROL INFORMATION

FIELD OF THE INVENTION

The present invention relates to bi-directional communication over a network and, in particular, relates to a method and system for multi-channel transfer of data.

BACKGROUND OF THE INVENTION

Traditionally, Digital Signal Processors (DSPs) have been used to run single channels, such as, for example, a single DS0 or time division multiplexed (TDM) slot, that handle single services, such as modem, vocoder, or packet processing. Multiple services require multiple channels and multiple DSPs, each running its own small executive program (small kernel) and application. The executive programs reserve some area in memory for application code. When applications need to be switched, these executive programs overlay this memory with the new application.

Channels may take one of the following forms: one channel carried on a physical wire or wireless medium between systems (also referred to as a circuit); time divisional multiplexed (TDM) channels in which signals from several sources such as telephones and computers are merged into a single stream of data and separated by a time interval; and frequency division multiplexed (FDM) channels in which signals from many sources are transmitted over a single cable by modulating each signal on a carrier at different frequencies.

Recent advances in processing capacity now allow a single chip to run multiple channels. With this increase in capacity has come a desire to run different services simultaneously and to switch between services.

A current method to implement multiple services or multiple channels involves writing all control, overlay, and task-switching code for each service or channel. This requirement causes additional engineering overhead for development and debugging of the applications. In addition, not all services may fit into the memory available to the DSP, and the services must be swapped in from the host system. This swapping—overlaying—adds significant complexity to the implementation of the DSP services. The extra development activity consumes DSP application development time.

SUMMARY OF THE INVENTION

A system and method for transferring information in a multi-channel, point-to-point environment are described. In one embodiment, a number of processing chips are connected to a bridge bus. A bridge is connected to the bridge bus and to a system bus. In addition, a memory is connected to the bridge.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
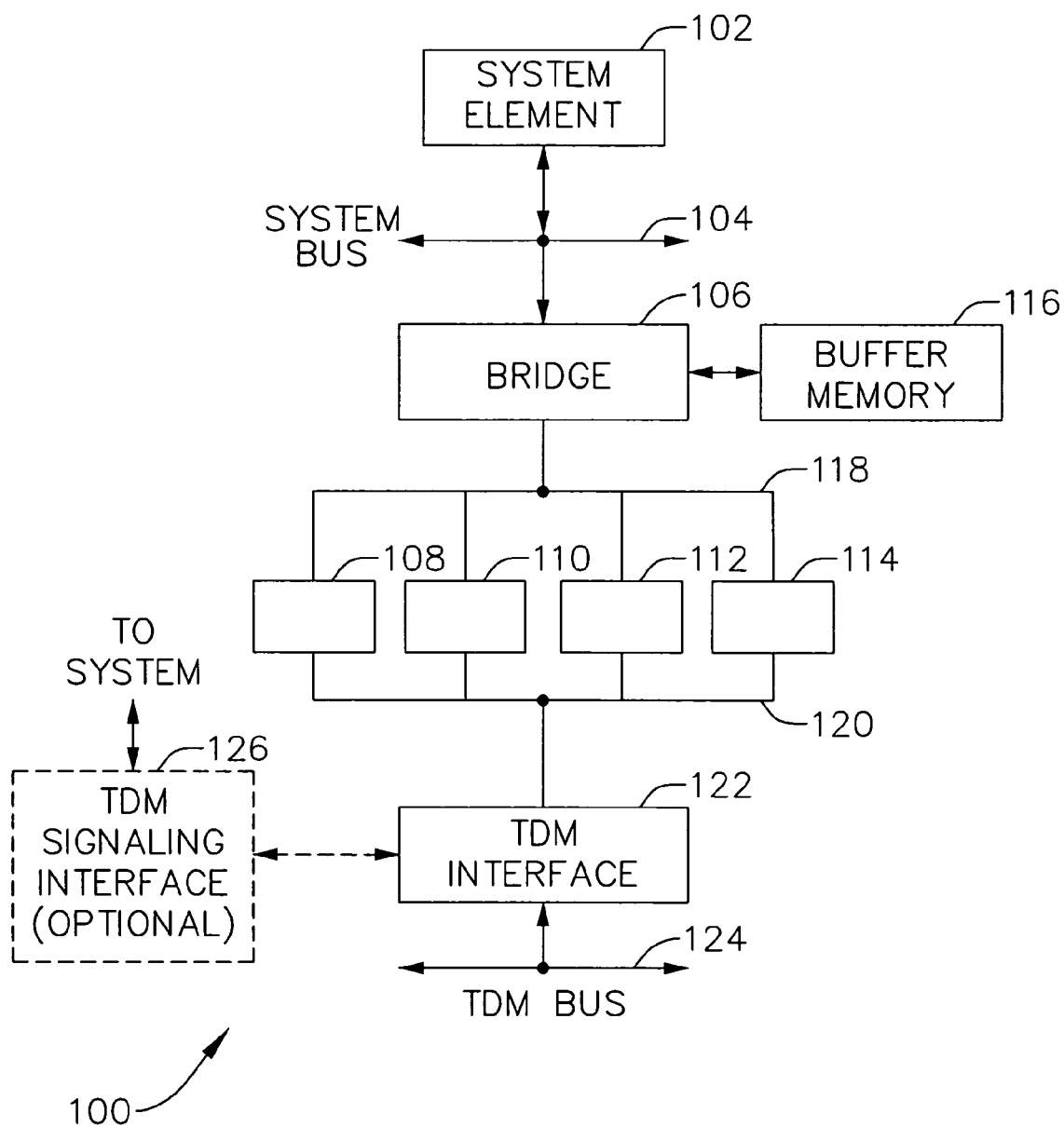
FIG. 1 is a system architecture of one embodiment for a multi-channel data transfer system.

A method and system for transferring data in a multi-channel, point-to-point environment are described. In one embodiment, a number of processing chips are connected to a bridge bus. A bridge is connected to the bridge bus and to a system bus. In addition, a memory is connected to the bridge. In one embodiment, the bridge includes a system bus interface connected to the system bus, a memory interface connected to the system bus interface, a cell initiated serial interface connected to the memory interface and to the bridge bus, and a control logic connected to the system bus interface, the memory interface, and the cell initiated serial interface.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. FIG. 1 is a system architecture of one embodiment for a multi-channel, multi-service system 100. Referring to FIG. 1, system element 102 is connected via system bus 104 and bridge 106 to a plurality of processing chips 108, 110, 112, 114. In addition, bridge 106 is connected to buffer memory 116. System element may be another bridge 106 configuration or other suitable component. Bridge 106 is connected via bus 118 to the processing chips 108–114. In one embodiment, processing chips 108–114 are connected via bus 120 to time division multiplexing (TDM) interface 122. In alternate embodiments, chips 108–114 may be connected to a digital signal 0 (DS0) interface or other applicable interface. In one embodiment, TDM interface 122 is connected to a number of modules and ports installed on the TDM bus 124. In addition, TDM interface 122 may optionally be connected to TDM signaling interface 126.

TDM is a base-band technology in which individual channels of data or voice are interleaved into a single stream of bits (or framed bits) on a communications channel. Each input channel receives an interleave time segment in order that all channels equally share the medium that is used for transmission. If a channel has nothing to send, the slot is still dedicated to the channel and remains empty.

In one embodiment, an operating system running within multi-channel data transfer system 100 supports telecommunication and data communication applications. These applications involve running multiple channels of protocol stacks built from multiple services. Multi-channel data transfer system 100 enables the dynamic configuration of services within the embedded telecommunication and data communication environment. In addition, the operating system automatically defines the allocation of resources for the channels within system 100.

In one embodiment, bridge 106 may interface up to six chips 108–113 to bus 104. In one embodiment, bridge 106 is a 32-bit Peripheral Component Interconnect (PCI) 2.1 compliant device, capable of running up to 33 MHz, and interfaces multiple processing chips 108–113 to PCI bus 104. In one embodiment, bridge bus 118 is a cell-based serial bus with point-to-point connections to each processing chip 108–113.

Figure 2:
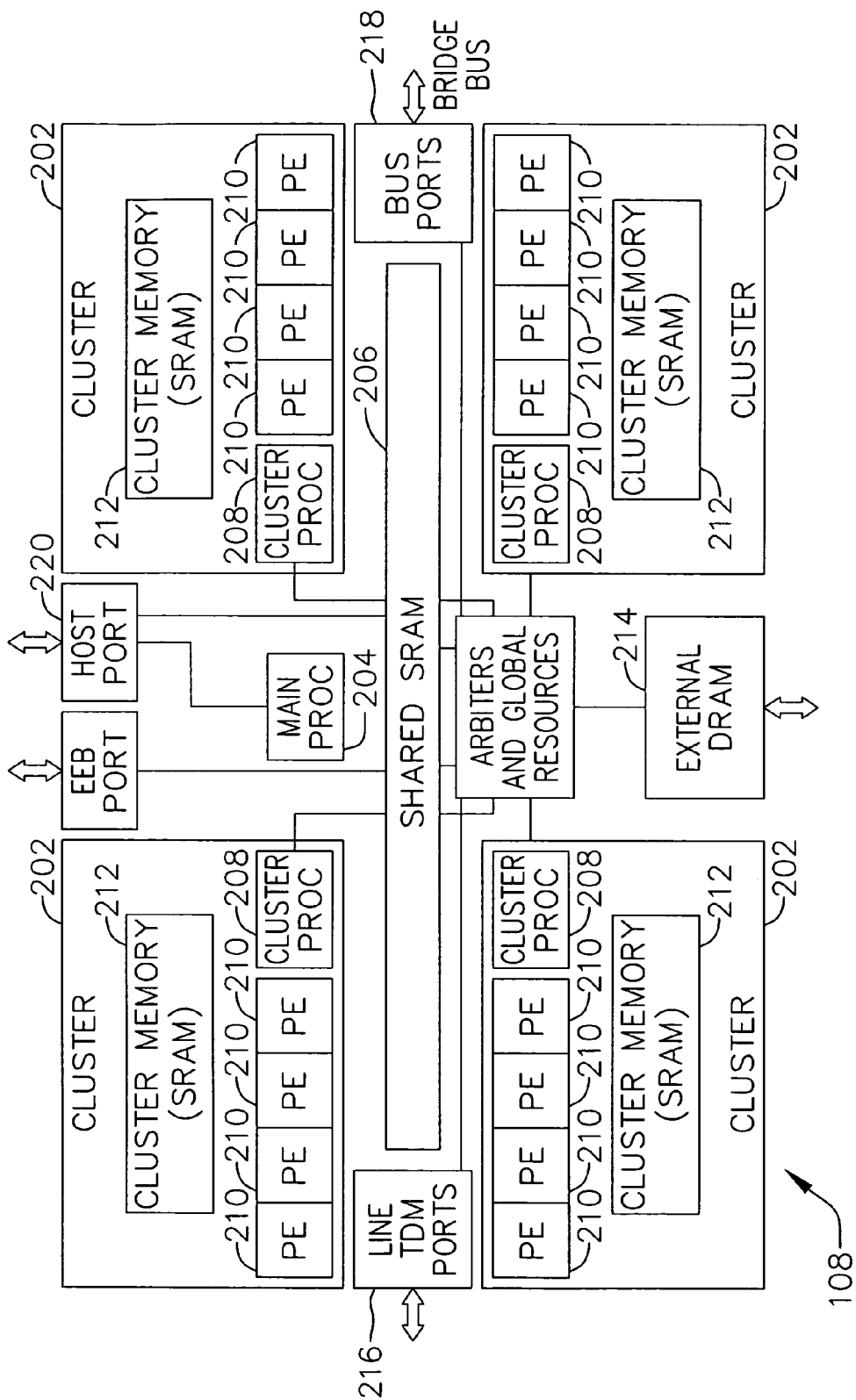
FIG. 2 is a block diagram of one embodiment for a processing chip of FIG. 1.

FIG. 2 is a block diagram of one embodiment for a processing chip 108. Each processing chip 108 contains clusters 202 and main processor 204. Each cluster 202 contains a cluster processor 208 and a number of basic functional units (BFUs) 210. Main processor 204 is configured to perform all control code and operations including receiving control messages from host 102 and allocating channels to various clusters 202.

Processing chip 108 also includes shared static random access memory (shared SRAM) 206. Shared SRAM 206 may be accessed directly by all the cluster processors 202 and main processor 204. An instruction store contained within BFUs 210 may also access shared SRAM 206. Shared SRAM 206 is used for storing operating system and application code as well as hosting the data for code running on main processor 204.

Each cluster 202 contains cluster SRAM 212. Cluster SRAM 212 is responsible for maintaining channel data running on each individual cluster 202. Cluster SRAM 212 includes I/O buffers and program stacks. The operating system of system 100 uses the hardware to enforce memory protection to prevent a channel from inadvertently corrupting another channel's data or code.

External dynamic random access memory (DRAM) 214 may be used for application data too large to fit on the on-chip cluster SRAM 212 or shared SRAM 206 and may be used as a swap area for application code.

In one embodiment, each processing chip 108 includes two line side ports 216 and two bus ports 218. These bus ports are used for packet side data and control transport. In addition, host port 220 is used to communicate with the host 102 and is accessible only from main processor 204 and serial boot port 222 that is used to send the boot stream to the chip.

Figure 3:
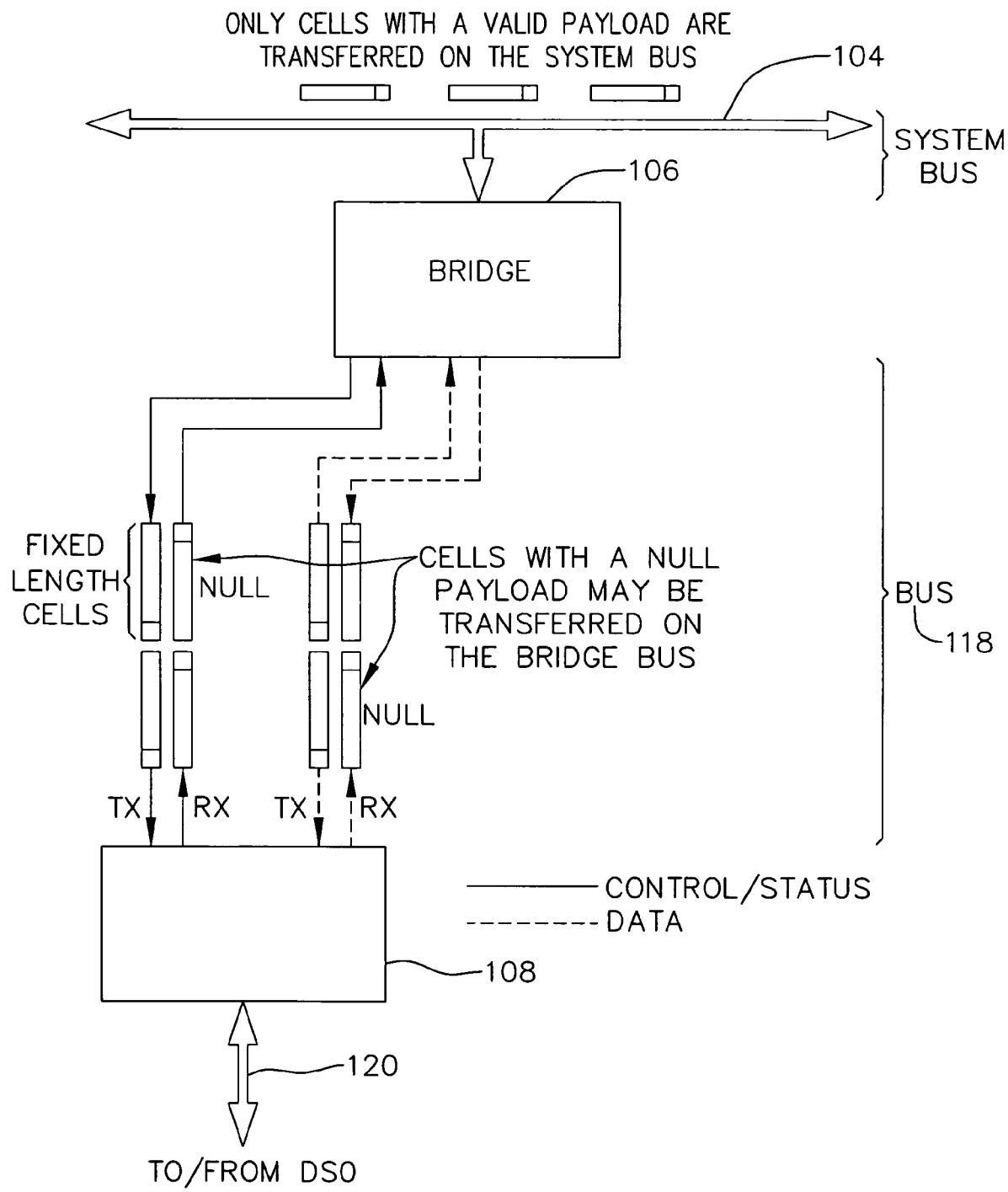
FIG. 3 is a block diagram of another embodiment for a multi-channel data transfer system.

FIG. 3 is a block diagram of another embodiment for a multi-channel data transfer system 100. Referring to FIG. 3, bridge 106 receives cells from system bus 104. The cells are transmitted (TX) from bridge 106 via bridge bus 118 to processing chip 108 and are received (RX) by bridge 106 via bridge bus 118 from processing chip 108. Cells may be either control/status cells or data cells.

In one embodiment, chip 108 subsystems operate using a write-oriented architecture. Data and control are both "pushed" or write-posted in each direction. Both data and control are transferred in fixed length, atomic cells. In one embodiment, the cells are 48 bytes in length in which each cell has an eight-byte header and a forty-byte payload. In one embodiment, bridge bus 118 is a point-to-point serial bus with separate physical paths for control and data. Bridge bus 118 is "always on" in that there is no request-grant protocol, and data is continuously transferred. If chip 108 or the bridge 106 has no valid data to send, null cells are transferred on bridge bus 118. These null cells are both generated and filtered (depending on the direction) by logic that resides in bridge 106 and processing chip 108. Null cells are generated to flow between chip 108 and bridge 106 and bridge 106 filters out null cells before transmitting data or control over system bus 104. The filtering of null cells prevents null data being transferred across the system bus 104 or internally within chip 108.

In one embodiment, bridge 106 supports up to six processing chips 108, or a maximum of 1024 channels, whichever comes first. Each chip 108 is capable of simultaneously supporting up to 256 channels by maintaining fixed length, per-channel queues for each processing chip 108, and servicing each of these channels. There are 16 control channels per chip 108. Consequently, 16 per-channel queues are maintained per chip 108 for control. Bridge 106 is unaware of the contents of each cell and makes queuing decisions based upon the contents of the cell header. In one embodiment, bridge 106 treats all cells similarly, with data and control cells following the same data path within bridge 106. In an alternate embodiment, data and control cells may follow separate paths.

Figure 4:
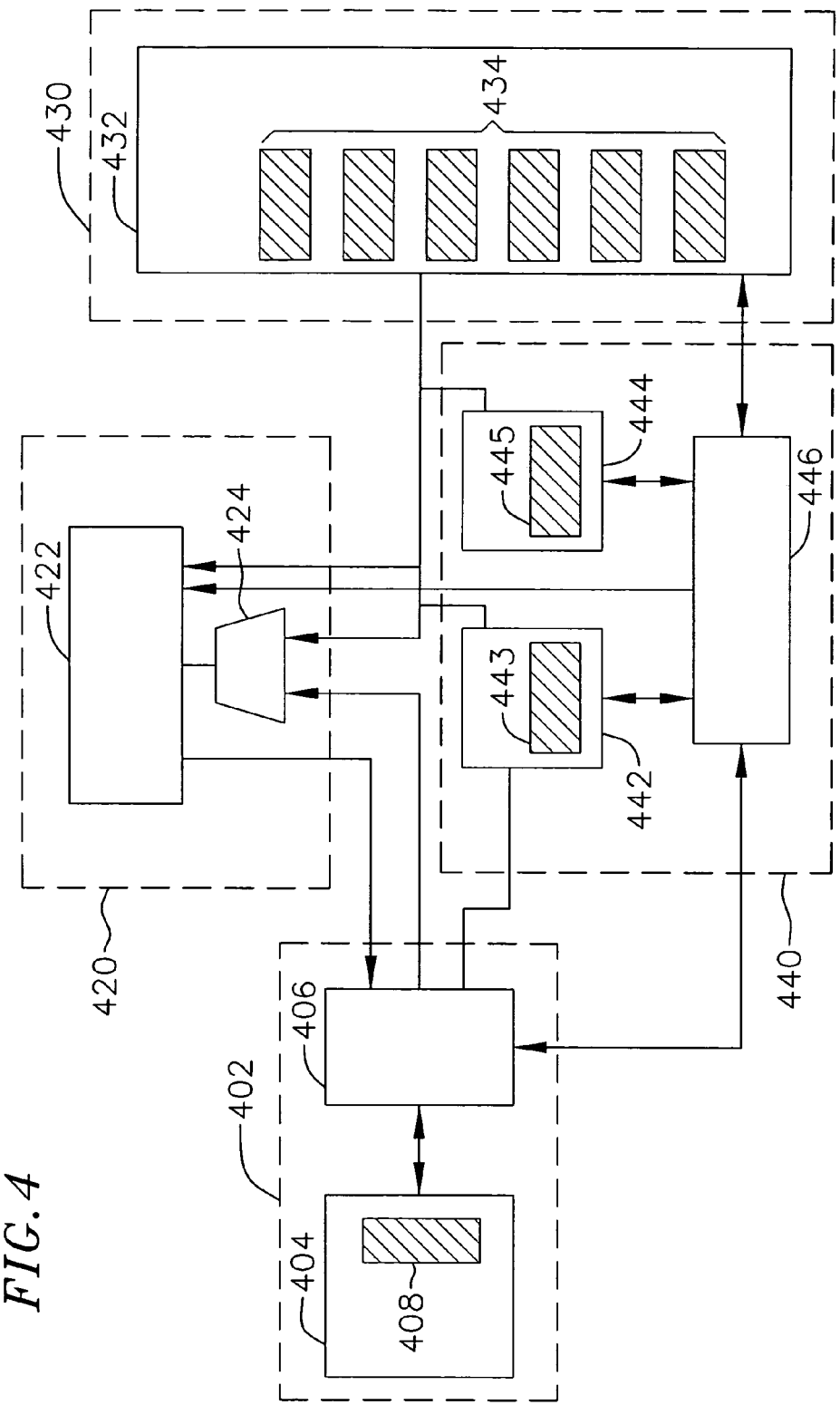
FIG. 4 is a block diagram of one embodiment for a bridge of FIG. 1.

FIG. 4 is a block diagram of one embodiment for bridge 106. Referring to FIG. 4, bridge 106 includes system bus interface 402, memory interface 420, cell initiated serial interface 430, and control logic 440. System bus interface 402 includes System interface 404 and system-local interface 406. System interface 404 performs the necessary protocol to interface to system bus 104. System interface 404 contains the necessary PCI configuration registers as well as a First-In-First-Out (FIFO) stack 408 to allow write-posting of control and data cells. System-local interface 406 is connected to System interface 404 with separate data paths for the transmit and receive logic. System-local interface 406 also has a separate bus for register access so that these transactions do not interfere with cell traffic.

Memory interface 420 includes buffer memory interface 422 and MUX 424. In one embodiment, buffer memory interface 422 provides a 32-bit data path interface to a standard synchronous dynamic random access memory (SDRAM). In alternate embodiments, buffer memory 116 may be any storage device such as, for example, EPROM, EEPROM, or the like. In one embodiment, buffer memory interface 422 moves cell-oriented traffic in and out of buffer memory 116 and uses the self-refresh facility of the buffer memory 116.

Cell initiated serial interface 430 includes bridge bus interface 432. Bridge bus interface 432 receives and transmits cells from and to processing chips 108–113. Bridge bus interface 432 uses FIFO buffers 434 to adapt to bridge bus 118 clock speed. In one embodiment, three clock domains are maintained within bridge 106. The first is the system clock domain, which is determined by the speed of system bus 104. The second is the bridge system clock which runs all the logic, including the memory controller, within bridge 106. The third clock domain is the bridge bus 118 clock domain, which interfaces with chips 108–113. In one embodiment, there is no assumed phase relationship between the clock domains and it is assumed that the bridge system clock runs faster than the bridge bus and system clocks. Bridge bus interface 432 also generates and filters null cells on the bridge bus 118.

Control logic 440 includes descriptor manager 442, pointer manager 444, and sequencer 446. Descriptor manager 442 manages the cell descriptors that are locations in the PCI-memory map where cells that are received may be stored. A large pool of descriptors is maintained in buffer memory 116 and a smaller set of descriptors is maintained in a pre-fetch buffer 443, which is periodically replenished.

Pointer manager 444 manages the head and tail pointers for all queues that are maintained in queue memory 445. When cells are en-queued and de-queued, the pointer manager updates the head and tail pointer. In one embodiment, each queue is maintained in a circular buffer within queue memory 445.

Sequencer 446 coordinates the interaction of system bus interface 402, memory interface 420, cell initiated serial interface 430, and control logic 440. Sequencer 446 allocates access to the memory to each of the requesters, and communicates with the various modules within bridge 106.

Figure 5:
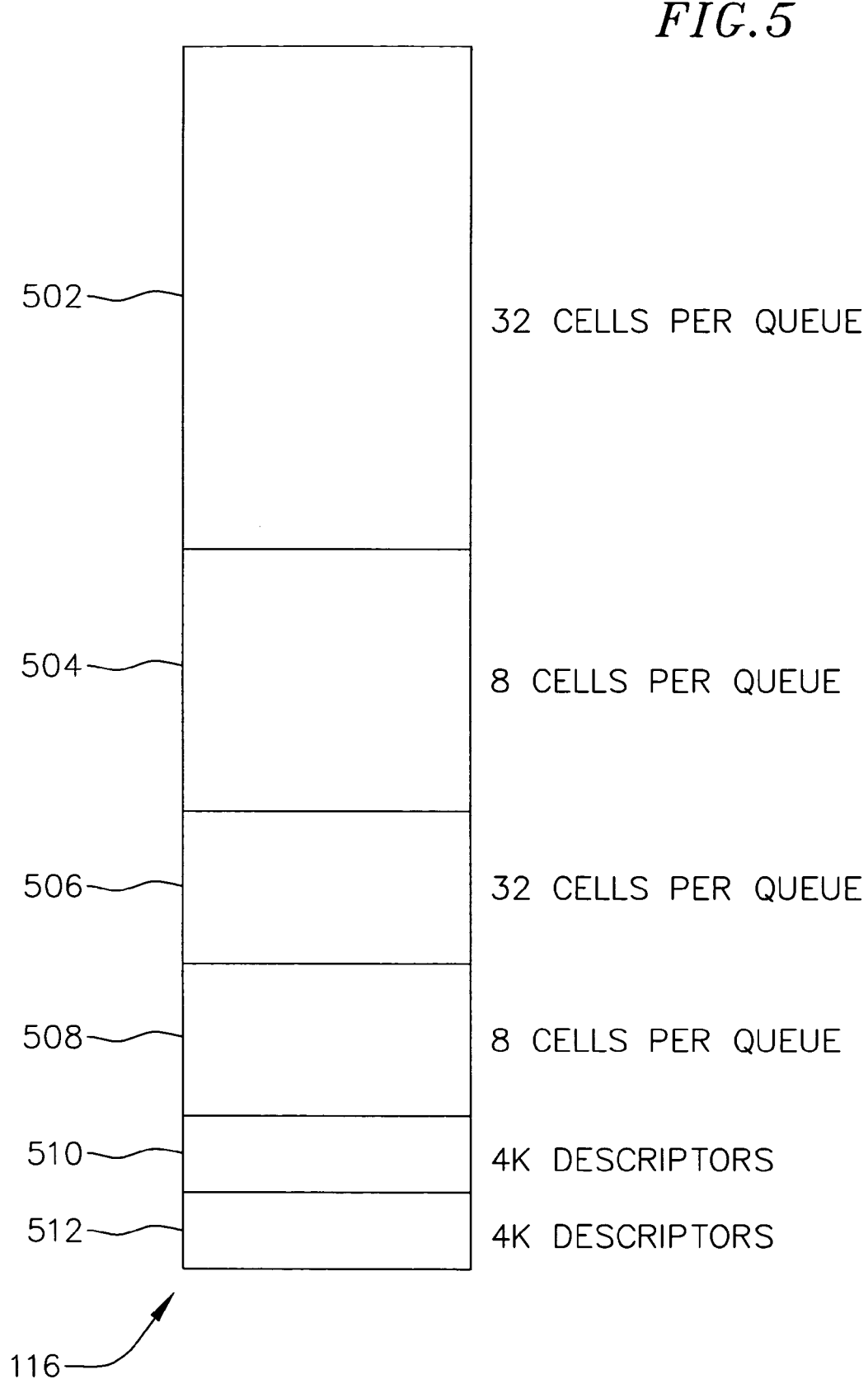
FIG. 5 is a block diagram of one embodiment for a buffer memory of FIG. 1.

FIG. 5 is a block diagram of one embodiment for buffer memory 116. In one embodiment, buffer memory 116 is a synchronous DRAM, organized as x32 memory and maintains per channel cell queues for both control and data. Each processing chip 108 is assigned guaranteed time-slots for en-queue and de-queue functions. In one embodiment, buffer memory 116 is maintained by pointer manipulation and is partitioned into six segments including transmit data buffer 502, receive data buffer 504, transmit control buffer 506, receive control buffer 508, receive data descriptors 510, and receive control descriptors 512.

In one embodiment, each descriptor is a 32-bit pointer to a cell buffer in host memory. Receive data descriptors 510 and receive control descriptors 512 each store 4K descriptors (each descriptor is 4 bytes). The two separate pools of available descriptors ensure that the throughput of data and control messages is separated, and the software resources that deal with them may also be separated.

In one embodiment, transmit data buffer 502, receive data buffer 504, transmit control buffer 506, and receive control buffer 508 are segmented into fixed length buffers for each processing chip 108–113 in system 100. In an alternate embodiment, the various buffers may be segmented into any suitable arrangement of lengths. The length of each segment is programmable at system startup.

Each processing chip 108–113 supports multiple channels, each of which is represented as a circular queue that is serviced in a FIFO-like manner. Queues are emptied as quickly as possible whenever a complete cell is available. This ensures minimum latency, while the length of the queue allows the potential for both statistical bandwidth sharing across channels and for buffering for other aspects of system overhead.

In one embodiment, during transmit of cells from system bus 104 to processing chip 108, cells are written in a FIFO-like manner to bridge 106 and are placed into the appropriate queues, as identified by the cell header. First-In-First-Out (FIFO) stack 408 is written to until it is full, at which point, a retry is issued on system bus 104. In addition, a programmable threshold value may cause back-pressure to be asserted to the host or to processing chip 108.

In one embodiment, during receive of cells from processing chip 108, receive data descriptors 510, and receive control descriptors 512 are used to transfer cells from bridge 106 to host 102. These descriptors are each 4-bytes in length and represent a pointer to a 48-byte buffer in memory where cells can be written. In one embodiment, descriptors are maintained as a circular queue, with bridge 106 managing the head pointer to this queue. Whenever a cell is available, bridge 106 fetches a descriptor from buffer memory 116 and advances the head pointer of the descriptor queue. Bridge 106 writes the cell to that buffer in host memory, and also writes the descriptor to a "used buffer queue" in host memory, which is also a circular buffer. As the host services the buffers, it also replenishes the buffer descriptors, which causes a tail pointer to be advanced.

In one embodiment, in the event that only a small number of buffer descriptors remain in the pool, an interrupt is asserted over system bus 104. The status of which device is running out of buffer descriptors is indicated via an interrupt status register. Under normal conditions, the interrupt should never be asserted, since the host should keep up with the packet processing. However, if system 100 is designed for statistical averages (as opposed to worst case requirements), the interrupts serve as an indicator that the buffers are not being replenished fast enough. These interrupts may be masked so that the interrupt service routine itself does not overwhelm the host processor.

Buffer memory interface 422 operates synchronous to system bus 104 clock. Buffer memory interface 422 allows accesses by requestors in a time-slot fashion in which requesters may be assigned one or more time-slots based upon the requester's requirements. Requestors may be assigned one or more timeslots based on their requirements. In one embodiment, each timeslot has a duration of 20 clock cycles (or 400 ns assuming a 50 MHz system clock).

In one embodiment, if six processing chips 108–113 are supported per buffer memory interface 422, then there are a total of twelve receive paths: six for control/status and six for data. A worst case receive latency may occur when cells arrive simultaneously on each of the twelve receive channels and are placed into buffer memory 116. The cells arrive at their respective time slots and each waits for transfer off the system bus 104 to host 102. In this embodiment, the worst case latency for a data cell may be written as:

Number of Clocks Per Slot*Number of Slots*Number of Data Channels Per Slot

For example, if Number of Clocks Per Slot=20, Number of Slots=50 and Number of Data Channels Per Slot=128, then using the above formula for the worst case:

$$= 20 * 50 * 128 \text{ clock cycles}$$
$$= 128{,}000 \text{ clock cycles}$$
$$= 2.56 \text{ ms (at 50 MHz system clock rate)}.$$

The worst case latency for a control cell may be written as:

Number of Clocks Per Slot*Number of Slots*Number of GCN Channels Per Slot

For example, if Number of Clocks Per Slot=20, Number of Slots=50, and Number of GCN Channels Per Slot=16, then using the above formula for the worst case:

$$= 20 * 50 * 16 \text{ clock cycles}$$
$$= 16{,}000 \text{ clock cycles}$$
$$= 320 \text{ ms (at 50 MHz system clock rate)}.$$

In one embodiment, on the transmit side, cells for each processing chip 108 are de-queued in round-robin fashion on a channel-by-channel basis. In this embodiment, the queue for each processing chip 108 are enqueued and dequeued for a fixed amount of timeslots in sequential order. For example, buffers for processing chip 108 are enqueued and dequeued for four time slots, buffers for processing chip 109 are enqueued and dequeued for four time slots, and so on. Thus, for transmit data, cells not only wait for the time-slot for their processing chip 108–113, but also wait for their round-robin turn within this time-slot. The worst case latency will occur when a transmit cell has just arrived and both the following conditions are satisfied: (1) the cell has just missed its turn for transmit within its processing chip 108 queue, and (2) the cell's corresponding processing chip 108 has missed its time-slot. Bridge bus 118 runs fast enough relative to the system clock such that the serial cell transit time on bridge bus 118 is less than the time taken to make a complete run through the 50 time-slots imposed by the sequencer. Thus, the cell needs to wait for its corresponding processing chip 108 to be assigned a time-slot (which is the total number of time-slots minus 1), multiplied by the total number of channels supported in each chip 108 minus 1 for its turn to be transmitted. In this event, the worst case latency for a data cell may be written as:

Number of Clocks Per Slot*Number of Slots*Number of Data Channels Per Slot

For example, if Number of Clocks Per Slot=20, Number of Slots=50 and Number of Data Channels Per Slot=128, then using the above formula for the worst case:

$$= 20 * 50 * 128 \text{ clock cycles}$$
$$= 128{,}000 \text{ clock cycles}$$
$$= 2.56 \text{ ms (at 50 MHz system clock rate,}$$
$$\quad 20 \text{ Mhz bridge bus 118)}.$$

The worst case latency for a control cell may be written as:

Number of Clocks Per Slot*Number of Slots*Number of GCN Channels Per Slot

For example, if Number of Clocks Per Slot=20, Number of Slots=50, and Number of GCN Channels Per Slot=16, then using the above formula for the worst case:

$$= 20 * 50 * 16 \text{ clock cycles}$$
$$= 16{,}000 \text{ clock cycles}$$
$$= 320 \text{ ms (at 50 MHz system clock rate,}$$
$$\quad 20 \text{ MHz bridge bus 118)}.$$

Figure 6:
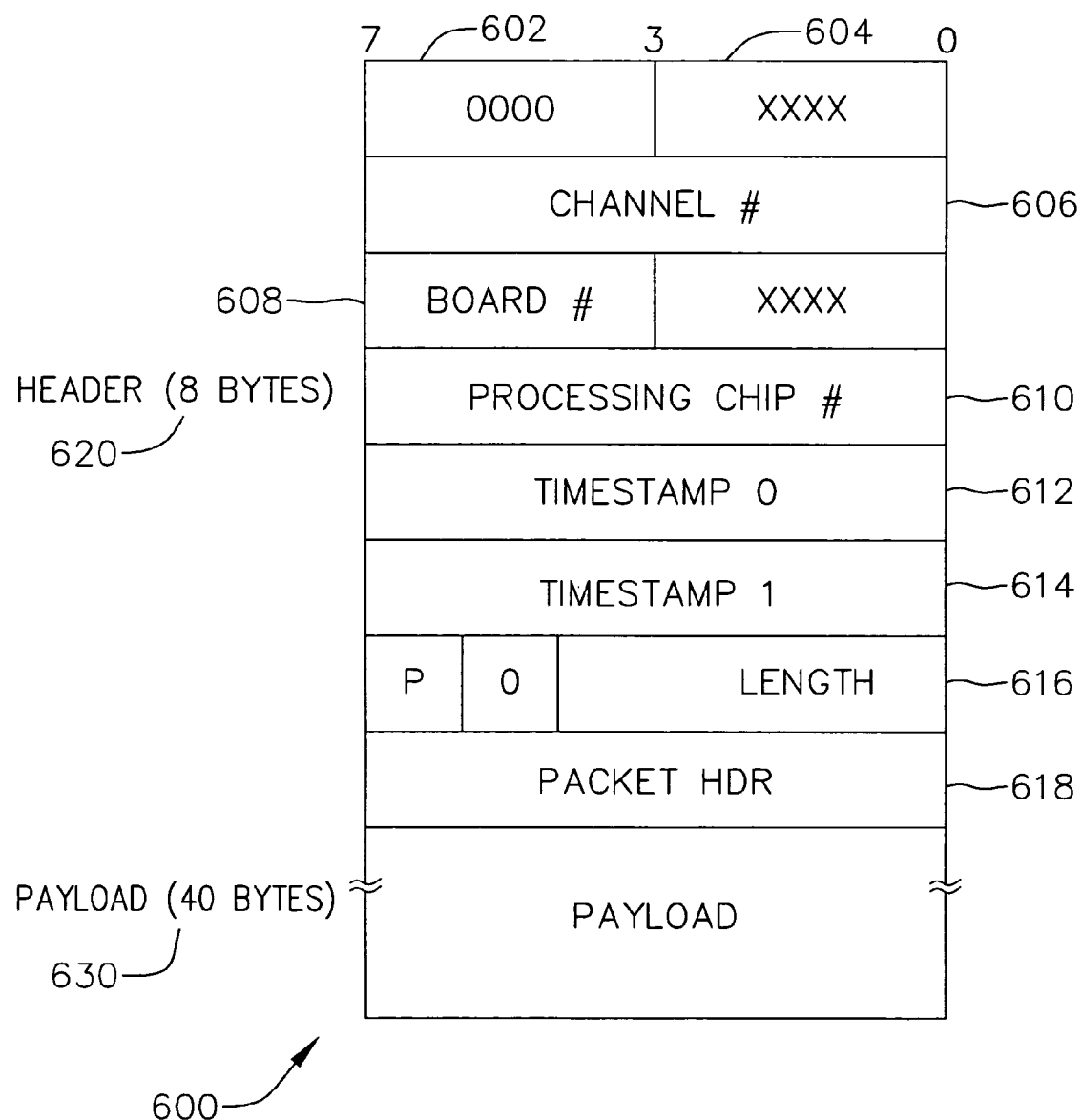
FIG. 6 is a block diagram of one embodiment for a bus data cell.

FIG. 6 is a block diagram of one embodiment for bus data cell 600. Referring to FIG. 6, bus data cell 600 is 48-bytes long, with an 8-byte header 620 and a 40-byte payload 630. Header 620 supports multiple processing chip 108-based subsystems, indicated by board number 608. Each subsystem may have multiple processing chips 108–113, indicated by chip number 610, which in turn may have multiple channels, indicated by channel number 606. In one embodiment, up to 256 channels per each processing chip 108 are supported. The high nibble 602 (4-bits) of the first byte of a cell is defined to be either "0000" for a data cell or "1111" for a control cell.

Figure 7:
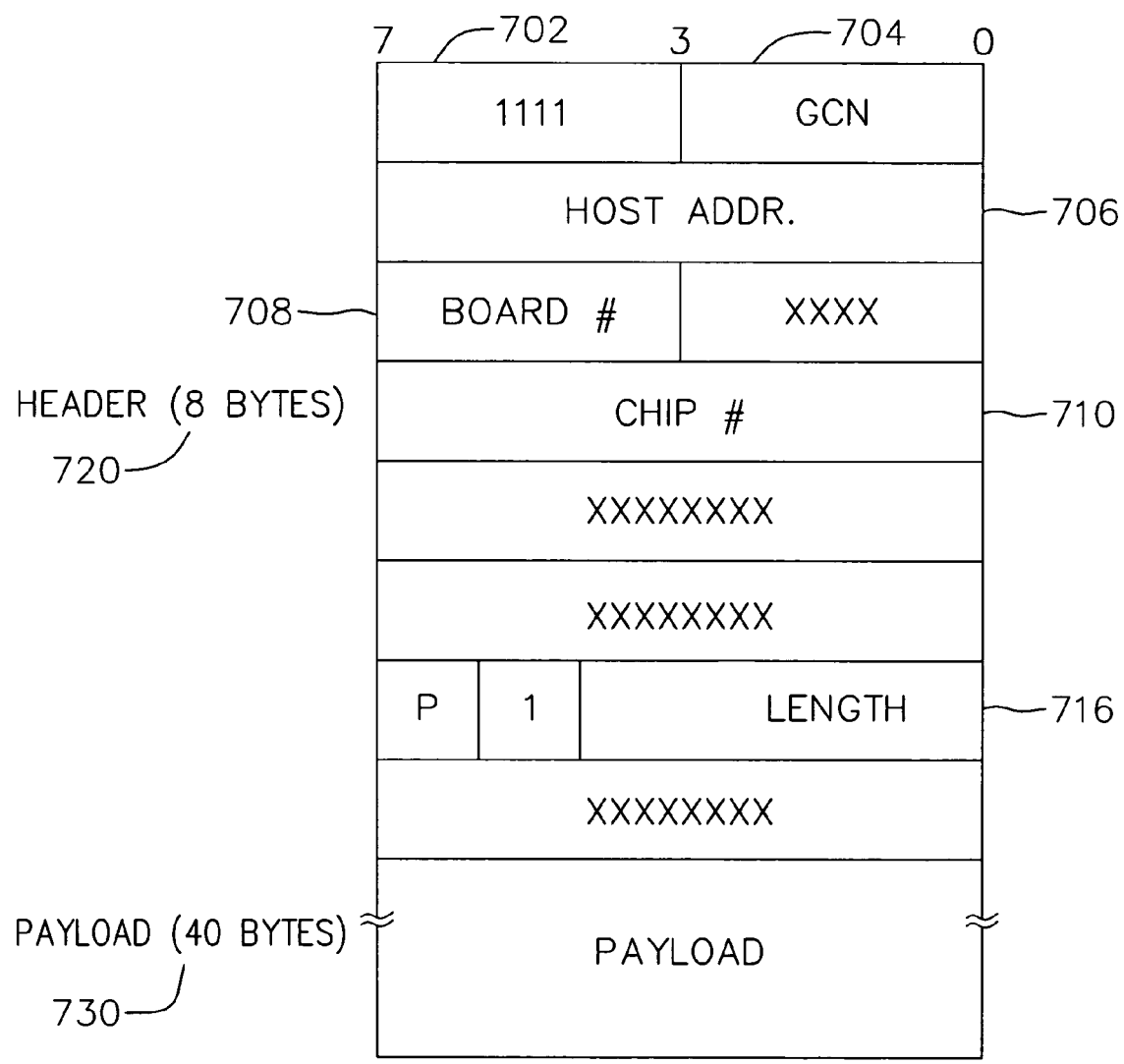
FIG. 7 is a block diagram of one embodiment for a bus control cell.

FIG. 7 is a block diagram of one embodiment for bus control cell 700. Referring to FIG. 7, bus control cell 700 is 48-bytes long, with an 8-byte header 720 and a 40-byte payload 730. Header 720 supports multiple processing chip 108-based subsystems, indicated by board number 708. Each subsystem may have multiple processing chips 108–113, indicated by chip number 710. The low nibble 704 (4-bits) in this sell is the Global Channel Number (GCN). In one embodiment, there are 16 global control channels per processing chip 108. Bridge 106 is supplied with separate control and data descriptors. Each descriptor is a 32 pointer to a cell buffer in the memory of host 102.

In one embodiment, host 102 replenishes the bridge descriptors in groups of 8 for the same type of descriptor. This group of 8 descriptors forms a descriptor update cell. Descriptor 0 is the first descriptor used, and descriptor 7 is the last descriptor. The first four descriptors in the cell are dummy pointers and are not placed in the descriptor pool.

Figure 8:
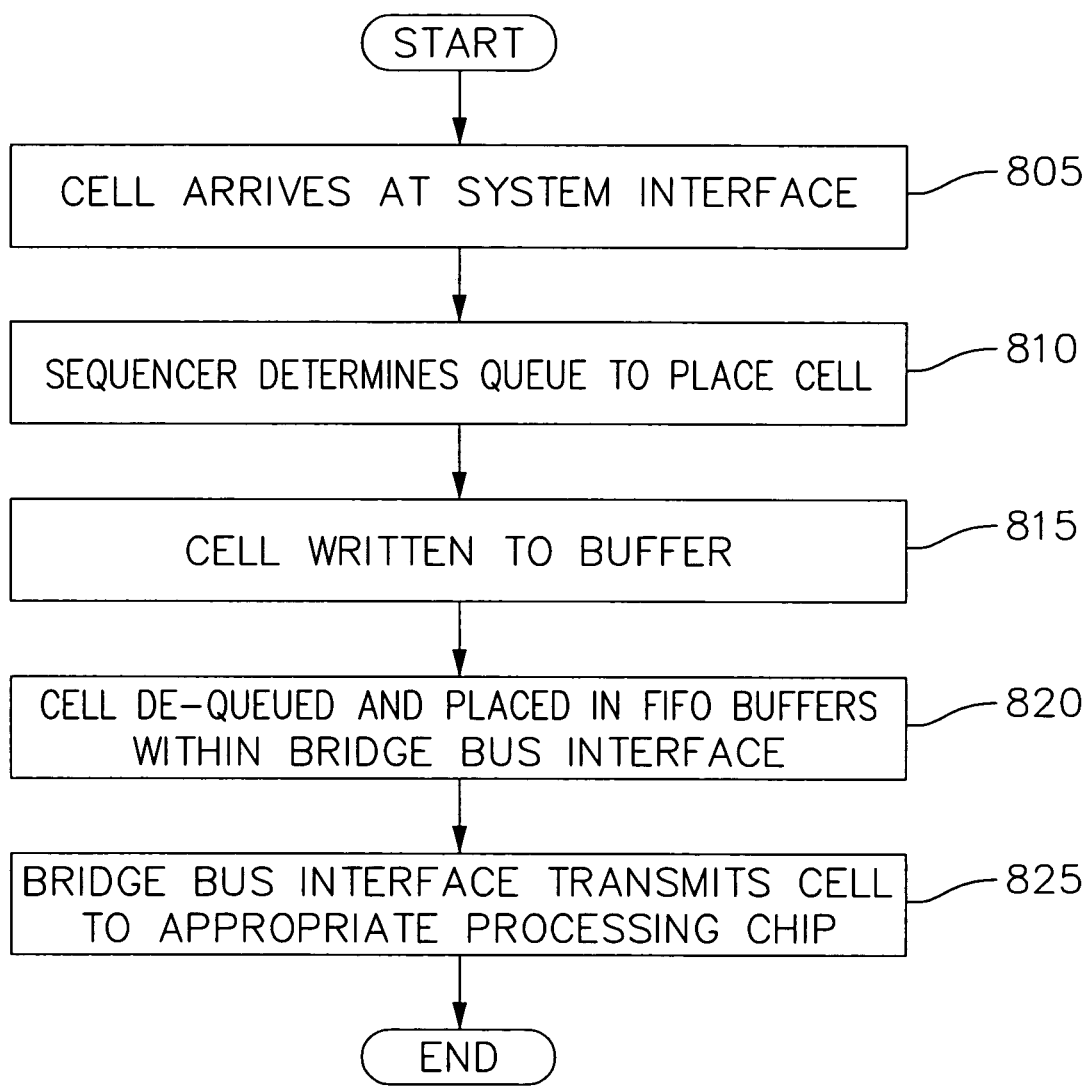
FIG. 8 is a flow diagram of one embodiment for the transmission of cells over a bus.

FIG. 8 is a flow diagram of one embodiment for transmission of cells over bridge bus 118. Initially at processing block 805, a cell arrives from system bus 104 at System interface 404 and is burst into FIFO stack 408. In addition, system bus interface 402 notifies sequencer 446 that the cell has arrived after FIFO stack 408 has accumulated the entire cell.

At processing block 810, sequencer 446 determines the proper queue to place the cell. Sequencer 446 determines which of the chips 108–113 is to be used and determines which of the queues within buffer memory 116 is required to store the cell. Sequencer 446 notifies system-local interface 406 where to place the cell within buffer memory 116.

At processing block 815, system-local interface 406 writes the cell into the proper queue within buffer memory 116. System-local interface 406 writes the cell into the appropriate transmit data buffer 502 corresponding to the appropriate chip 108–113 that was determined by sequencer 446.

At processing block 820, the cell is dequeued from buffer memory 116 and placed within bridge bus interface 430. The cell is placed in the appropriate FIFO buffer 434 corresponding to processing chips 108–113 for the cell when the particular timeslot for chips 108–113 comes up.

At processing block 825, bridge bus interface 432 transmits the cell to the appropriate processing chip 108–113. When the timeslot for the chips 108–113 comes up if no data is available, then bridge bus interface 432 inserts a null cell and bursts the null cell to chips 108–113.

Figure 9:
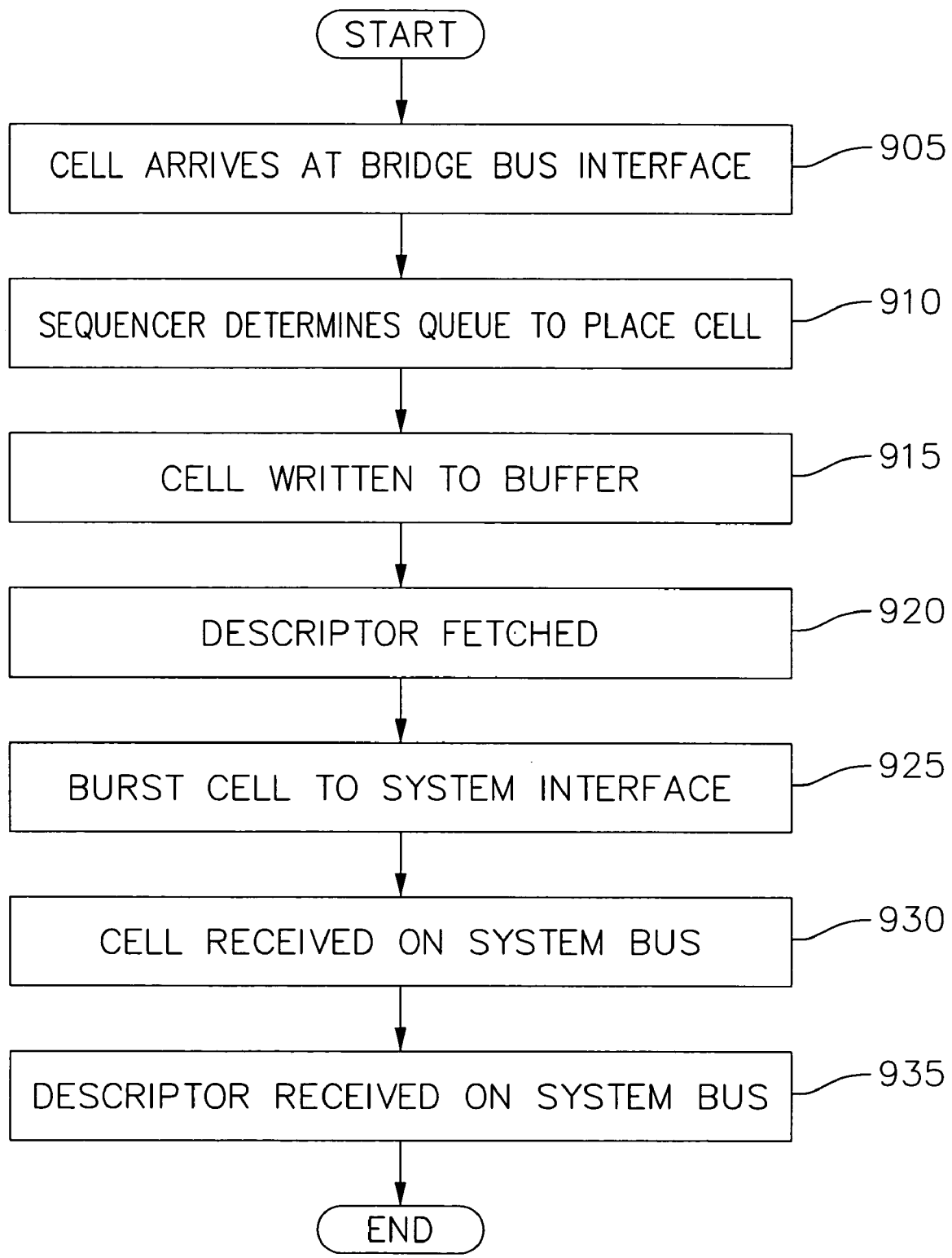
FIG. 9 is a flow diagram of one embodiment for the receiving of cells over the bus.

FIG. 9 is a flow diagram of one embodiment for receiving of cells over bridge bus 118. Initially at processing block 905, a cell arrives at bridge bus interface 432 from chips 108–113. Bridge bus interface 432 places the cell in the appropriate FIFO queue 434. If the cell is a null cell, bridge bus interface 432 removes the null cell and no further processing is required for that cell.

At processing block 910, sequencer 446 determines the proper receive queue 504 to place the cell. At processing block 915, the cell is written to the appropriate queue within buffer memory 116.

At processing block 920, when the timeslot for the appropriate queue for the cell comes up, the appropriate descriptor is fetched from receive data descriptors 510 by descriptor manager 442. The descriptor is the address or buffer location within host memory that the cell belongs. Sequencer 446 instructs system-local interface 406 where to fetch the cell from buffer memory 116 and instructs system-local interface 406 where the cell is to be sent on system bus 104.

At processing block 925, system-local interface 406 bursts the cell to system interface 404. System interface 404 places the burst cell in FIFO buffer 408.

At processing block 930, the cell is received on system bus 104.

At processing block 935, System interface 404 bursts the descriptor and the descriptor is received on system bus 104.

In the foregoing specification, the invention has been described with reference to specific exemplary embodiments thereof. It will, however, be evident that various modifications and changes may be made thereto without departing from the broader sprit and scope of the invention as set forth in the appended claims. The specification and drawings are, accordingly, to be regarded in an illustrative rather than a restrictive sense.

What is claimed is:

1. A system for transferring data in a multi-channel, point-to-point environment, the system comprising:

a plurality of processing chips connected to a bridge bus;
a bridge connected to the bridge bus and to a system bus;
a plurality of buffers coupled to the bridge, each buffer being assigned to a respective processing chip; and
a first memory connected to the bridge, the first memory storing cells that are exchanged between the bridge bus and the system bus, each cell including an address for the at least one processing chip, wherein the bridge places a cell destined for a destination processing chip in the respective buffer assigned to the destination processing chip and wherein the bridge places a cell received from an initiating processing chip in a location assigned to the initiating processing chip in a second memory coupled to the system bus.

2. The system of claim 1 wherein the bridge comprises:
a system bus interface connected to the system bus;
a memory interface connected to the system bus interface;
a cell initiated serial interface connected to the memory interface and to the bridge bus; and
a control logic connected to the system bus interface, the memory interface, and the cell initiated serial interface.

3. The bridge of claim 2 wherein the system bus interface further comprises a first-in first-out (FIFO) stack for storing write-postings of data cells.

4. The bridge of claim 2 wherein the cell initiated serial interface generates null cells for transfer to the bridge bus.

5. The bridge of claim 2 wherein the cell initiated serial interface removes null cells received from the bridge bus.

6. The system of claim 1, wherein the bridge bus has a first data transfer protocol and the system bus has a second data transfer protocol, and wherein the first data transfer protocol and the second data transfer protocol are different data transfer protocols.

7. A bridge for transferring data in a multi-channel, point-to-point environment, the bridge comprising:
a system bus interface connected to a system bus;
a memory interface connected to the system bus interface and to a memory, wherein the memory stores cells that are transmitted over the point-to-point environment, each cell including an address for the at least one processing chip;
a cell initiated serial interface connected to the memory interface and to a bridge bus; and
a control logic connected to the system bus interface, the memory interface, and the cell initiated serial interface, wherein the control logic places a cell destined for a destination processing chip in a respective buffer assigned to a destination processing chip, and places a cell received from an initiating processing chip in a second respective buffer assigned to the initiating processing chip.

8. The bridge of claim 7 wherein the system bus interface further comprises a first-in first-out (FIFO) stack for storing write-postings of data cells.

9. The bridge of claim 7 wherein the cell initiated serial interface generates null cells for transfer to the bridge bus.

10. The bridge of claim 7 wherein the cell initiated serial interface removes null cells received from the bridge bus.

11. The bridge of claim 7, wherein the bridge bus has a first data transfer protocol and the system bus has a second data transfer protocol, and wherein the first data transfer protocol and the second data transfer protocol are different data transfer protocols.

12. A method of transmitting data in a multi-channel, point-to-point environment, the method comprising:
transmitting a cell to a first bus;

selecting a memory queue from a plurality of memory queues in which to place the cell, wherein each memory queue is assigned to a respective of a plurality of processing chips;
writing the cell to the selected memory queue;
placing the cell within a bridge buffer; and
bursting the cell to a respective processing chip corresponding to the bridge buffer via a second bus;
receiving a second cell from a respective processing chip; and
placing the received cell in a second memory location coupled to the first bus and assigned to the respective processing chip.

13. The method of claim 12 wherein a cell is a data cell or a control cell.

14. The method of claim 12 further comprising: inserting a null cell if no data is transmitted for a channel.

15. The method of claim 12 wherein the cell of data is fixed in size.

16. The method of claim 12 further comprising: allocating a queue per channel.

17. The method of claim 16 further comprising: allocating a queue for data cells; and allocating a queue for control cells.

18. The method of claim 12 wherein cells are continuously burst to the appropriate processing chip.

19. The method of claim 12 wherein timeslots are allocated on a channel-by-channel basis.

20. A method of receiving data in a multi-channel, point-to-point environment, the method comprising:
receiving a cell by a first bus coupled to a plurality of processing chips;
determining a receiving queue from a plurality of queues in which to place the cell;
placing the cell within a bridge buffer;
saving the cell into the queue;
fetching a descriptor corresponding to the cell;
bursting the cell to a bus interface that corresponds to the appropriate processing chip;
receiving the cell on a system bus; and
placing the cell in a location corresponding to the descriptor in a memory coupled to the system bus.

21. The method of claim 20 wherein a cell is a data cell or a control cell.

22. The method of claim 20 further comprising: removing null data cells.

23. The method of claim 20 wherein the cell of data is fixed in size.

24. The method of claim 20 further comprising: allocating a queue per channel.

25. The method of claim 24 further comprising: allocating a queue for data cells; and allocating a queue for control cells.

26. The method of claim 20 wherein cells are continuously received.

27. The method of claim 20 wherein timeslots are allocated on a channel-by-channel basis.

28. A system for transmitting data in a multi-channel, point-to-point environment, the system comprising:
means for transmitting a cell to a first bus;
means for selecting a memory queue from a plurality of memory queues in which to place the cell, wherein each memory queue is assigned to a respective of a plurality of processing chips;
means for writing the cell to the selected memory queue;
means for placing the cell within a bridge buffer; and
means for bursting the cell to the respective processing chip corresponding to the bridge buffer via a second bus;
receiving a second cell from a respective processing chip; and
placing the received cell in a second memory location coupled to the first bus and assigned to the respective processing chip.

29. A system for receiving data in a multi-channel, point-to-point environment, the system comprising:
means for receiving a cell by a first bus coupled to a plurality of processing chips;
means for determining a receiving queue from a plurality of queues in which to place the cell;
means for placing the cell within a bridge buffer;
means for saving the cell into the queue;
means for fetching a descriptor corresponding to the cell;
means for bursting the cell to a bus interface that corresponds to the appropriate processing chip;
means for receiving the cell on a system bus; and
means for placing the cell in a location corresponding to the descriptor in a memory coupled to the system bus.

30. A computer readable medium comprising instructions, which when executed on a processor, perform a method for transmitting data in a multi-channel, point-to-point environment, comprising:
transmitting a cell to a first bus;
selecting a memory queue from a plurality of memory queues in which to place the cell, wherein each memory queue is assigned to a respective of a plurality of processing chips;
writing the cell to the selected memory queue;
placing the cell within a bridge buffer; and
bursting the cell to a respective processing chip corresponding to the bridge buffer via a second bus;
receiving a second cell from a respective processing chip; and
placing the received cell in a second memory location coupled to the first bus and assigned to the respective processing chip.

31. A computer readable medium comprising instructions, which when executed on a processor, perform a method receiving data in a multi-channel, point-to-point environment, comprising:
receiving a cell by a first bus coupled to a plurality of processing chips;
determining a receiving queue from a plurality of queues in which to place the cell;
placing the cell within a bridge buffer;
saving the cell into the queue;
fetching a descriptor corresponding to the cell;
bursting the cell to a bus interface that corresponds to the appropriate processing chip;
receiving the cell on a system bus; and
placing the cell in a location corresponding to the descriptor in a memory coupled to the system bus.

* * * * *